(12) United States Patent
Keays et al.

(10) Patent No.: US 7,784,835 B1
(45) Date of Patent: Aug. 31, 2010

(54) PIPE CONNECTING MEMBER

(76) Inventors: Steven J. Keays, 722-53rd Ave. SW., Calgary, Alberta (CA) T2V 0C3; Curtis L. Patterson, #608, 1800-4th St. SW., Calgary, Alberta (CA) T2S 2S4

( * ) Notice: Subject to any disclaimer, the term of this patent is extended or adjusted under 35 U.S.C. 154(b) by 852 days.

(21) Appl. No.: 11/567,163

(22) Filed: Dec. 5, 2006

(51) Int. Cl.
*F16L 27/04* (2006.01)

(52) U.S. Cl. ............... 285/261; 285/224; 285/302; 285/145.3

(58) Field of Classification Search ......... 285/224, 285/261, 302, 298, 145.1, 145.2, 145.3, 146.3
See application file for complete search history.

(56) References Cited

U.S. PATENT DOCUMENTS

| | | | | |
|---|---|---|---|---|
| 314,007 | A * | 3/1885 | Emerson | 285/302 |
| 878,317 | A * | 2/1908 | Seiffert | 285/113 |
| 1,439,714 | A | 12/1922 | Severson | |
| 1,780,693 | A * | 11/1930 | Yazel | 285/9.2 |
| 2,242,604 | A * | 5/1941 | Wells | 285/31 |
| 2,381,426 | A | 8/1945 | Allen et al. | |
| 2,473,710 | A * | 6/1949 | Jillson | 285/121.4 |
| 2,616,728 | A * | 11/1952 | Pitt | 285/47 |
| 2,845,283 | A * | 7/1958 | Kuhn | 285/146.2 |
| 2,955,850 | A * | 10/1960 | Bellinger | 285/18 |
| 3,173,710 | A * | 3/1965 | Kinnison | 285/9.2 |
| 3,427,051 | A * | 2/1969 | White et al. | 285/145.5 |
| 3,854,758 | A * | 12/1974 | Lewis | 285/114 |
| 4,005,881 | A * | 2/1977 | Burton et al. | 285/111 |
| 4,040,650 | A * | 8/1977 | Shotbolt | 285/18 |
| 4,351,351 | A * | 9/1982 | Flory et al. | 137/68.14 |
| 4,371,198 | A * | 2/1983 | Martin | 285/145.1 |
| 4,475,750 | A * | 10/1984 | Campbell | 285/95 |
| 4,776,617 | A | 10/1988 | Sato | |
| 5,740,839 | A | 4/1998 | Kuo et al. | |
| 5,897,146 | A * | 4/1999 | Saito et al. | 285/145.3 |
| 6,056,329 | A | 5/2000 | Kitani et al. | |
| 6,237,965 | B1 | 5/2001 | Kuo | |
| 6,257,625 | B1 | 7/2001 | Kitani et al. | |
| 6,273,476 | B1 | 8/2001 | Ikeda et al. | |
| 6,299,217 | B1 | 10/2001 | Saito et al. | |
| 6,854,486 | B2 | 2/2005 | Challender | |
| 6,883,550 | B2 | 4/2005 | Bekki et al. | |
| 7,503,590 | B2 * | 3/2009 | Challender et al. | 285/261 |

* cited by examiner

*Primary Examiner*—David E Bochna
(74) *Attorney, Agent, or Firm*—Brian G Forrest; Hughes Law Firm, PLLC

(57) ABSTRACT

A pipe connecting mechanism having first and second pivot attachment systems that are rotatably attached to a central connecting portion. The central connecting portion has a telescopically extending connection where a flexing assembly allows for a prescribed amount of motion between the first and second pivot attachment assemblies.

9 Claims, 12 Drawing Sheets

PIPE CONNECTING MEMBER

BACKGROUND

Routinely in the oil and gas industry, colloquially known as the oil patch, two connecting standard-size flanges of land high-pressure piping need to be connected. A common prior art method currently in use today is to measure the difference between two ends of pipe which must be in sealed communication, and cut a proper length of pipe to fit there between. Thereafter, the workmen would position the pipe into its ultimate destination, and fit proper flanges and tack weld these connecting flanges to the center piece of pipe. Once it is measured, the pipe is put on a bench and welded together by hand. Thereafter, it is usually common practice to send this welded unit to an oven for stress relief to relieve any internal stresses which form during the welding process. Further, it is common practice to bathe this unit in an acid bath to remove slag and other types of debris which may form thereon, in particular from the weld. At any rate, there is a fair amount of construction and processing and fabrication required which of course takes time and a certain amount of skill in the art. Finally, the unit must be pressure tested before actually placing this prior art connecting member to the final pipe. Of course, this means fitting it up to a proper pressure testing rig which applies pressure thereto to ensure that the newly fabricated unit can withstand the requisite pressures pursuant to the industry standard. After this process listed in detail above, if the unit is not fit for whatever reason it must be re-fabricated and all of the above-mentioned steps must be re-executed.

Of course, this process is very expensive and utilizes many man-hours and further requires a large amount of downtime before completion of connecting to piping members. It should be further noted that the operating environment for connecting pipes can often be in some remote location. Many of the above-mentioned steps require some form of a shop which again can be expensive for having such services in remote locations.

SUMMARY OF THE DISCLOSURE

Disclosed herein is a connecting member comprising first and second pivot attachment assemblies. The pivot attachment assemblies comprising an attachment portion connected to a shoulder socket, a ball joint attached in a recessed region of the shoulder socket. A central connector connected to the ball joint and having an interior surface defining a fluid passageway. The central connector comprises a first and second members where the first member telescopically extends within the second member. The second member in one form is attached to the shoulder socket of the second pivot attachment assembly. The central connector further comprising a flexing assembly having first and second attachment portions. The first attachment portion is fixedly attached to the first member and the second attachment portion is fixedly attached to the second member. The flexing assembly comprises a plurality of longitudinally extending members being operatively configured to allow a predefined forceful degree of travel between the first and second attachment portions of the flexing assembly.

In one form the second member has an interior surface having at least part of a conical shape that is adapted to receive the first member therein and the first member has an end portion having a circumferential seal adapted to extend within the interior surface of the second member and is adapted to be positioned inward or outward of the connecting member after installation. The connecting member can further have the inward and outward relocation of the first member with respect to the second member occurring by way of vibration.

The connecting member can further have inward and outward repositioning of the first member within the second member occurring with regard to thermal expansion of the installation environment.

The first and second members in one form comprise a plurality of spring members positioned on either side of the first or second attachment portions of the flexing assembly to allow a prescribed amount of movement there between. Further the flexing assembly comprises first and second members pivotally attached about a longitudinal pivot axis where a latching mechanism is positioned on an opposing portion of the flexing assembly with respect to the longitudinal pivot axis and is adapted to engage an outer surface of the first and second members of the central connector.

The connecting member in one form has the first and second ball joints have an interior surface defining a fluid passage where the fluid passage of the ball joint has interior and exterior portions and located in the exterior portion is a frusto-conical interior surface. Further, the attachment portions of each respective ball joint of the first and second pivot attachment assemblies have an interior surface defining a fluid passageway defining a central axis where at any extreme orientation of the ball joint with respect to the shoulder socket, an interior surface of the attachment portion projects within an outer lip of the frusto-conical surface of the adjacent ball joint. Another way of defining the surfaces is where the frusto-conical surfaces of the ball joints define a ball joint central axis where the apical angle between the ball joint center axis and the frusto-conical interior surface of the ball joint is less than the degree amount of maximum rotation from the ball joint center axis with respect to a center axis of the adjacent attachment portion when the ball joint is at a maximum angle of rotation with respect to the shoulder socket.

The flexing assembly can be a non-unitary device with respect to the first and second members and attaches to the outer surface of the first and second members at the first and second attachment portions, respectively. The first attachment portion of the flexing assembly defines an inner grooved surface that is adapted to engage a corresponding grooved surface of the first member and the second attachment portion of the flexing assembly has an inner grooved surface at the second attachment portion that is adapted to engage a grooved outer surface of the second member of the central connector. The inner grooved surface of the second attachment portion of the flexing assembly can be of a greater diameter than the inner grooved surface of the first attachment portion of the flexing assembly.

The connecting member can be arranged where the first and second ball joints have three circular seals positioned there around interposed between an outer surface of the ball joint and the recess region of the shoulder socket. In one form the second member at a longitudinally inward region has a retaining ring to prevent the first member from being removed from the second member.

Further disclosed is a method of connecting first and second pipe members comprising steps by first positioning a connecting member between flange regions of the first and second pipe members and attaching a first connection pivot assembly of the connecting member to a first pipe member.

The steps then comprise repositioning a central portion of the connecting member with respect to the connected region of the connecting member to the first pipe member to orientate a second pivot attachment assembly in proximity to the second pipe member. Then telescopically extend a central region of the connecting member so the second pivot attachment assembly is in engagement to the second pipe member. Then the steps include attaching the second pivot attachment assembly to the second plate member. Finally the steps include attaching a flexing assembly to the central region of the connecting member and providing spring-like members of the flexing assembly to allow for a prescribed amount of relative co-axial motion between the first and second pivot attachment assemblies of the connecting member, whereby attaching the first and second pivot attachment assemblies, a first and second pivot attachment assembly axis is aligned with a center axis of the first and second pipe members where the axis of the first and second pipe members are not co-linear. Of course some of the steps can be executed in a different order than described above.

The movement between the first and second connection members can be by way of a vibration and a sealing system of the central region of the connecting member is employed whereby the connecting central region comprises first and second telescopically extending members. In one form the first and second pivot attachment assemblies have an interior ball and socket joint where the ball joint has a frusto-conical surface having an outer lip that does not extend beyond the interior portion of the cylindrical surface defining a fluid passageway. Further, deflections between the first and second piping members can be absorbed by the flexing assembly and the central member telescopically repositions to accommodate such repositioning after installation. Of course various modifications and alterations can be made to the embodiments shown without departing from the concept of the claimed elements recited herein.

DESCRIPTION OF THE PREFERRED EMBODIMENTS

Figure 1:
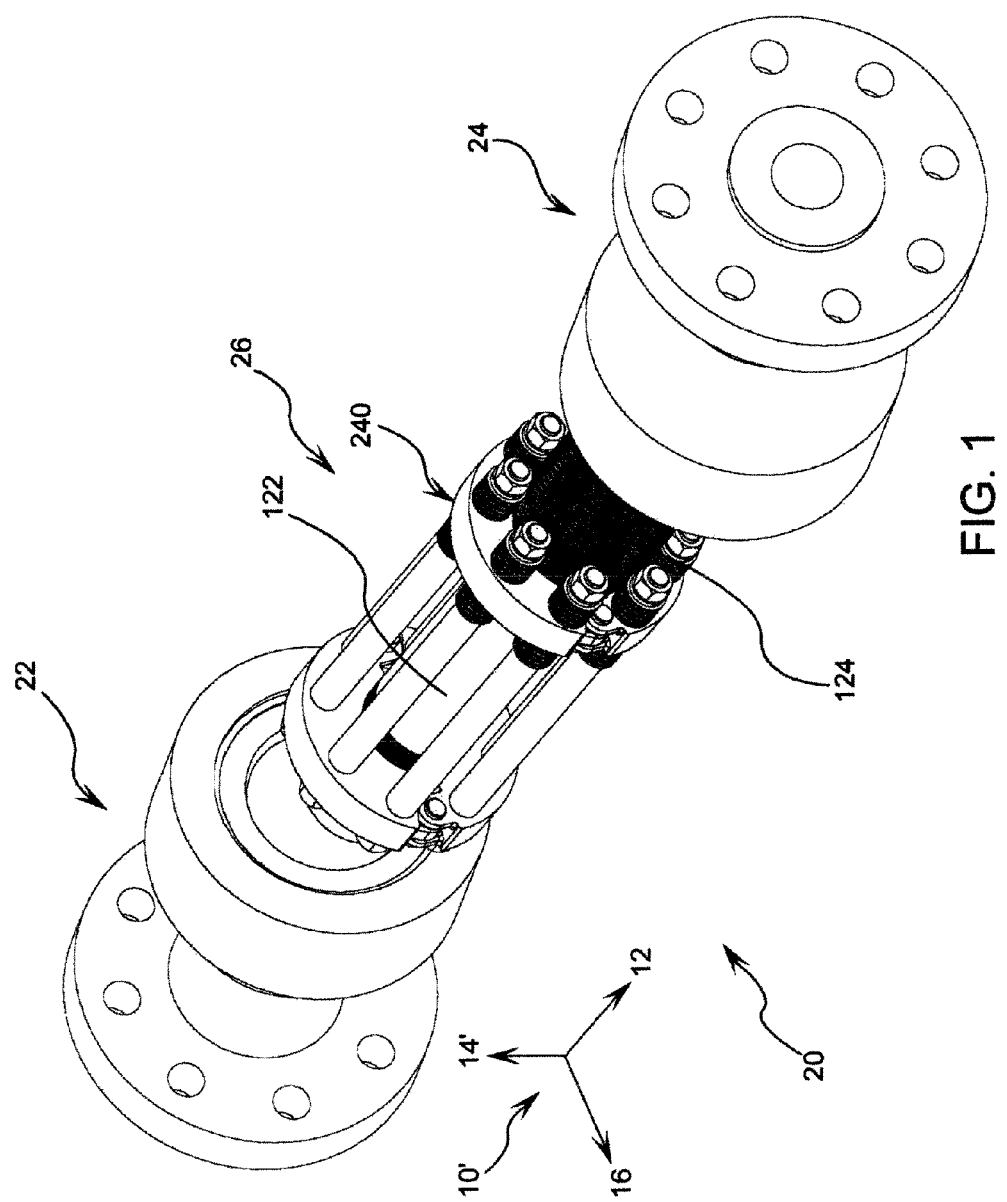
FIG. 1 shows an isometric view of the connecting member.

As shown in FIG. 1, there is a connecting member 20. In general, the connecting member comprises first and second pivot attachment systems 22 and 24 and a central connector 26. Before engaging in further discussion, reference is made to FIG. 3 where there is shown an axis system 10 which comprises the longitudinal axis 12 where from the center portion of the connecting member 20, going outward in the longitudinal direction is referred to as a longitudinal outward direction, and from either end traveling to the center region is referred to as a longitudinal inward direction. The axis indicated at 14 represents a radial axis which in most embodiments extends radially outward from the center of the member 20. With reference to the center axis in FIG. 3, the center axis 30 of the central connector 26 is shown, thereby placing the axes system 10 where the longitudinal axis 12 is co-linear with the central axis 30, any orthogonal axis extending from the axis 12 is the radial axis 14. However, for reference purposes, as shown in FIG. 1, the axes system 10' shows the longitudinal axis 12 and then shows the transverse axis 14' and the lateral axis 16 with reference to the flexible assembly 240.

Figure 4:
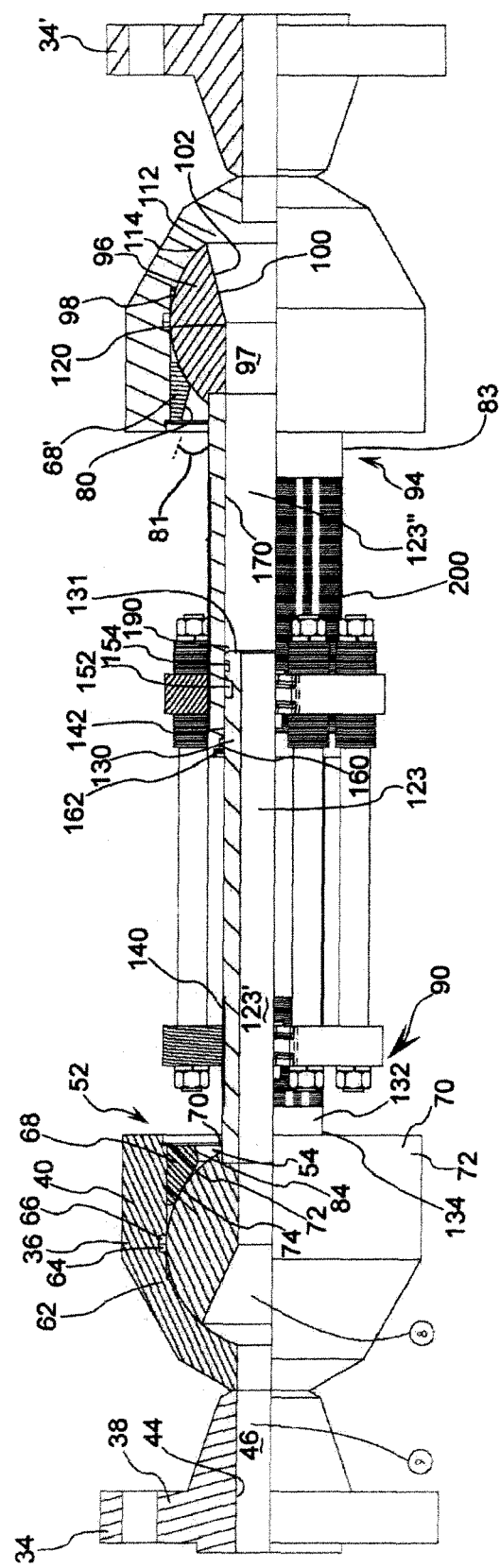
FIG. 4 shows a partial sectional view of the connecting member showing the various ball-and-socket joints as well as a plurality of sealing assemblies.

Now referring back to FIG. 2, it can be seen how the first and second pivot attachment assemblies 22 and 24 along with the central connector 26 have central reference axes 28, 30 and 32 respectively. Referring now to FIG. 4, there will be a discussion of the first and second pivot attachment assemblies 22 and 24 followed by a more detailed discussion of the central connector 26, which includes a detailed description of the flexing assembly 240 which is shown in one form in FIGS. 7 and 8.

Figure 3:
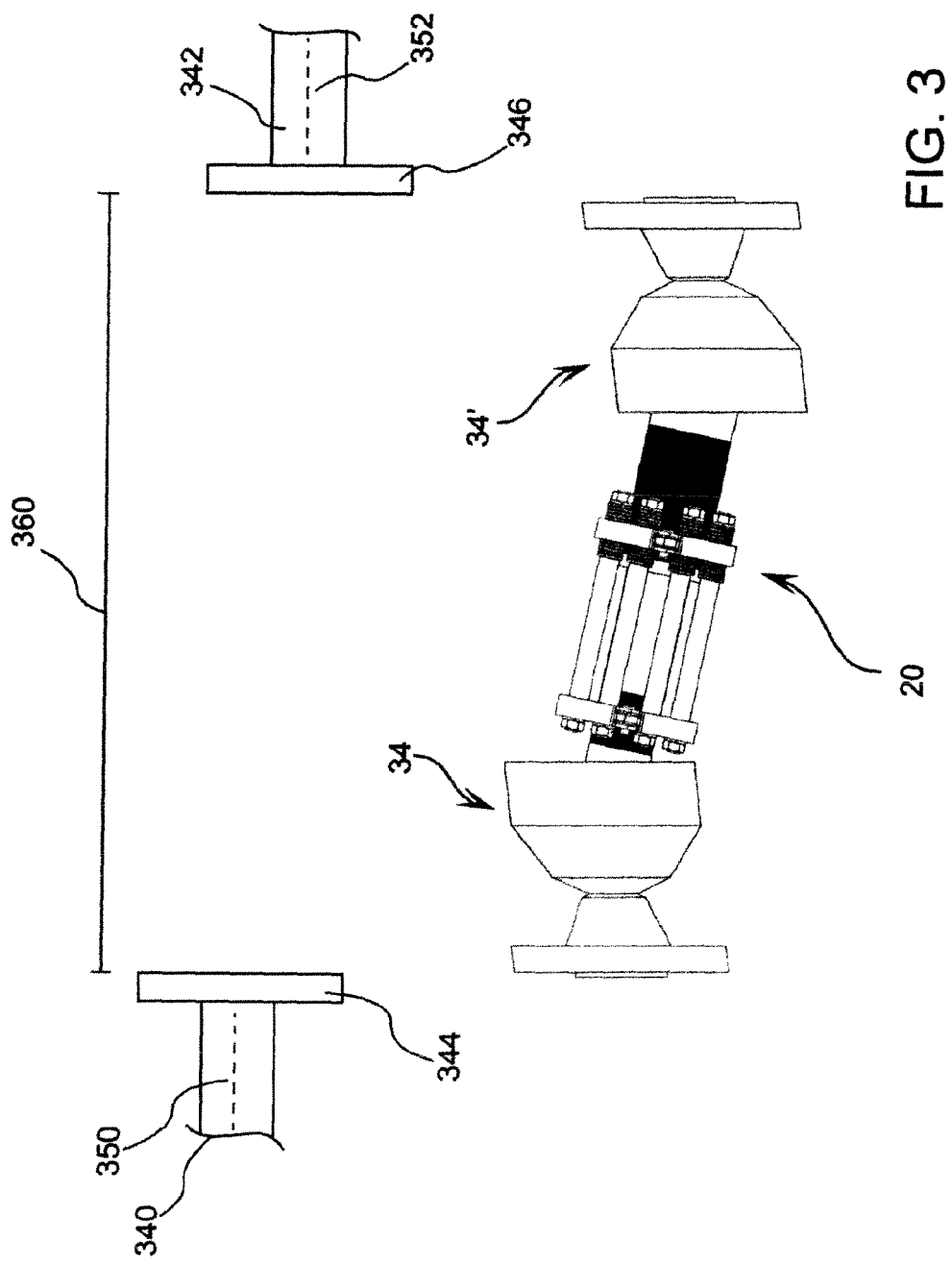
FIG. 3 shows the connecting member schematically installed in an operating environment.

With the foregoing introduction in place with the general components and reference axes, reference is initially made to the side view in FIG. 3 showing the pivot attachment assembly 22. Because the pivot attachment assemblies 22 and 24, in one form, are of a substantially similar structure, if not identical, the pivot attachment assembly 22 will be described in detail with the understanding that the description is entirely relevant to the second pivot attachment assembly 24. As shown in FIG. 3, the pivot attachment assembly comprises an attachment portion 34 and a shoulder socket 36. In one form, the attachment portion 34 is a flange-like member adapted to be fitted to a first pipe fixture 340 such as that shown in FIG. 3 where the attachment process is described further herein in detail. In one form, the attachment portion 34 and the shoulder socket 36 are manufactured separately and formed as a unitary piece by creating a circular weld indicated at the joinder region 39.

Figure 2:
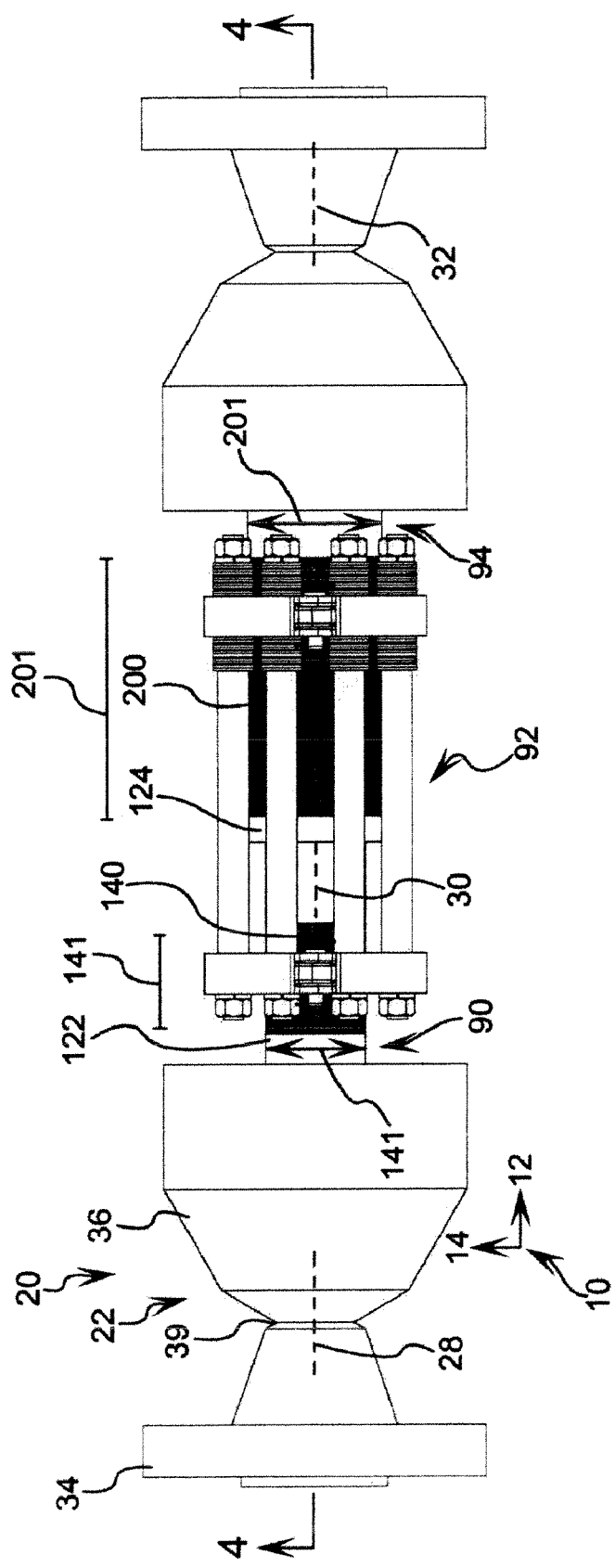
FIG. 2 shows a side view of the connecting member.
Figure 6A:
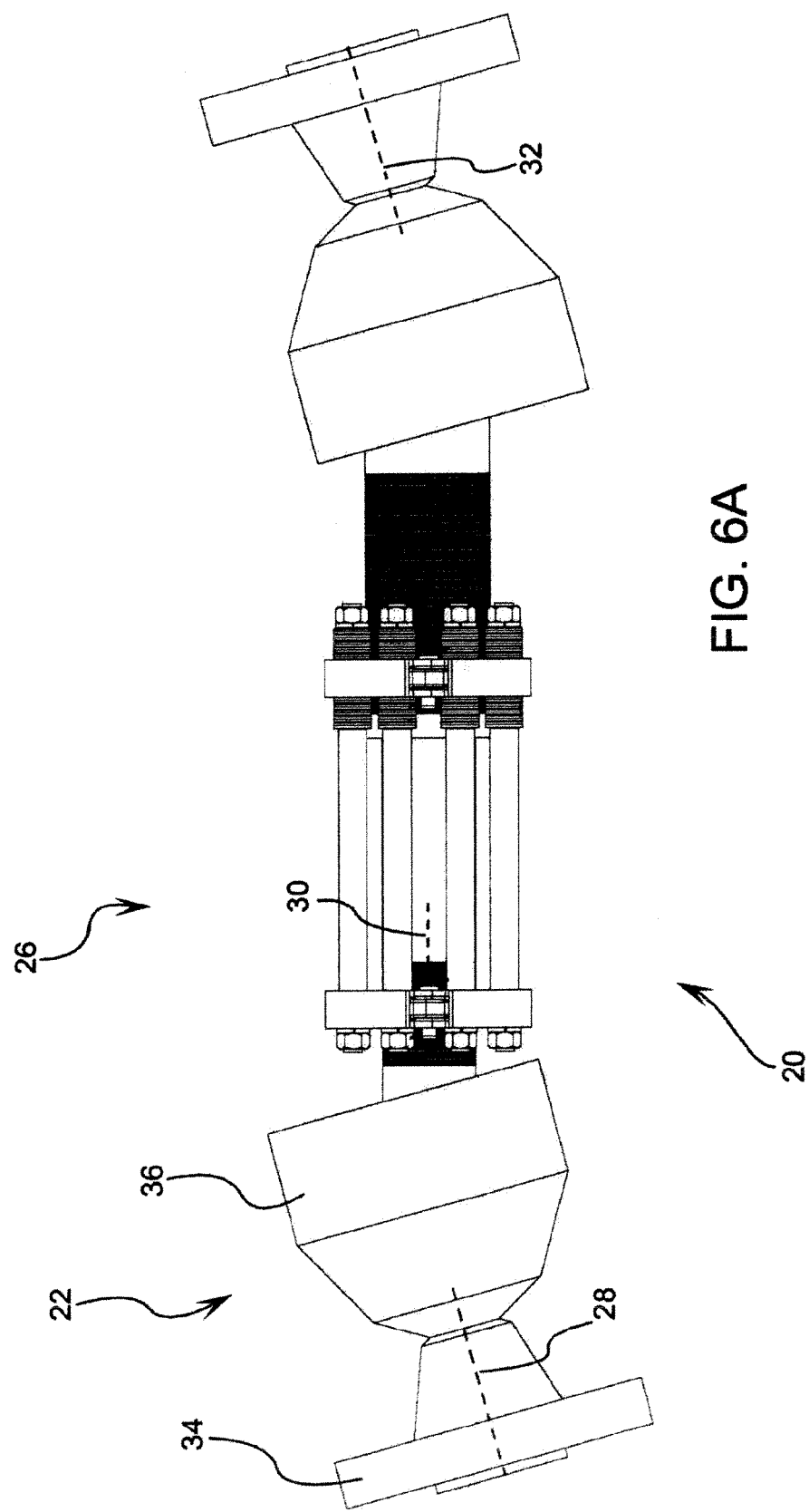
FIG. 6A shows a side profile view of the connecting member illustrating the various angles of reorientation of the end regions with respect to the central portion.
Figure 6B:
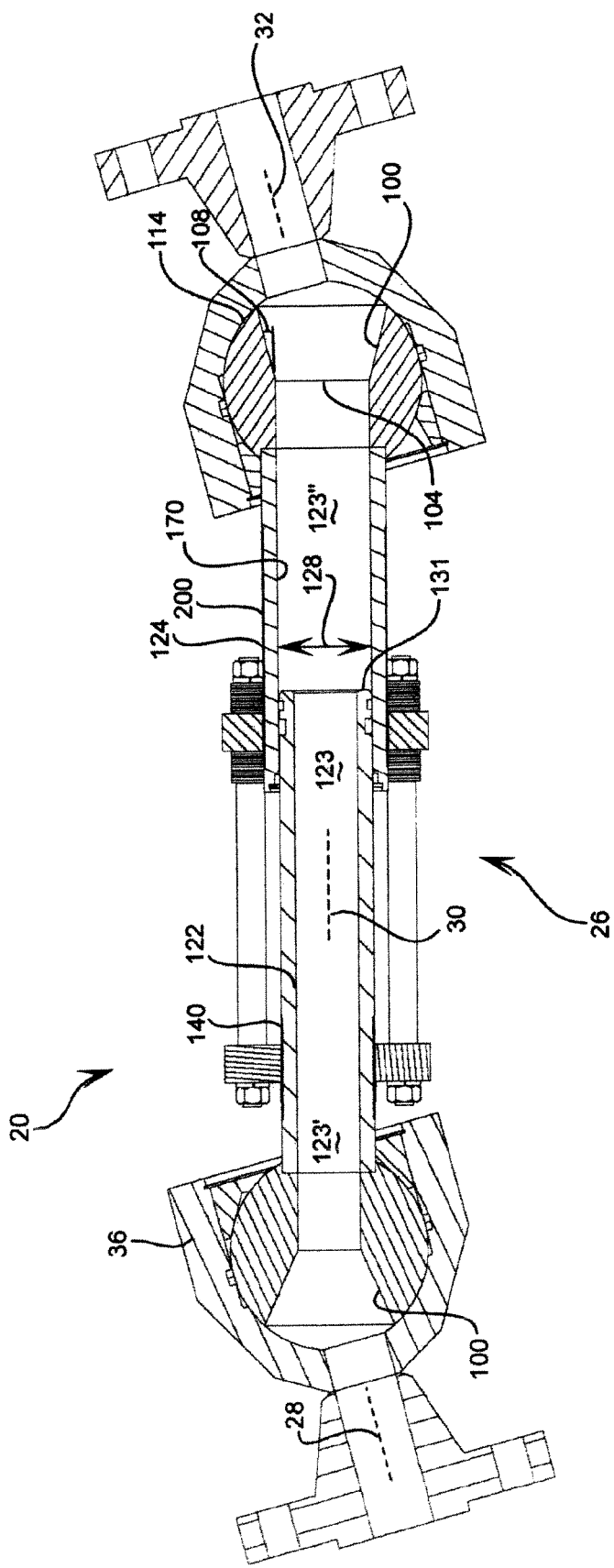
FIG. 6B shows the connecting member in a cross-sectional view where the shoulder regions are at an angle with respect to the central region.

Now referring to FIG. 4, there is shown the attachment portion 34 in a partial sectional view. In one form, the attachment portion 34 comprises a circular rim region 38 comprising a plurality of surfaces 40 defining opening 42. The openings 42 are configured to be common in the industry and positioned to engage the flange member 344 in FIG. 3 of the first pipe fixture 340. As mentioned above, the axis 28 is positioned in one form at the center of the attachment portion, about for example the longitudinal axis when in the orientation as shown in FIG. 4. As shown in FIG. 6B, the center axis is positioned in the center of the cylindrical surface indicated at 44. In general, the cylindrical surface 44 defines a fluid passageway 46 which is adapted to pass fluid therethrough. As described further herein with reference to FIG. 2, in one form, the fluid passageway of the attachment portions 22 and 24 are cylindrical or at substantially cylindrical. In one form, the diameter (of course as well as the cross-sectional surface area) of the attachment portions 22 and 24 are the same or substantially similar to that of the first and second pipe fixtures 340 and 342 in FIG. 3. Of course, in the broader scope, the fluid passageway 46 may not be cylindrical, and could be of other cross-sectional shapes in the substantial longitudinal direction when in a cooling orientation such as that shown in FIG. 4. However, pursuant to industry practice and manufacturing processes, the preferred form is to have a cylindrical fluid passageway 46. There will now be a description of another element of the attachment of the pivot attachment assembly 22 referring to the shoulder socket 36. As shown in FIG. 3, the side view shows the shoulder socket 36 where a first end of the central connector 26 is terminated therein. As shown in FIG. 6A, it can be appreciated how the shoulder member 26 is adapted to reposition with respect to the central connector 26 at least 2 degrees of freedom so the center axis 28 and 30 reposition about a conical volume about the center point of the shoulder socket described herein. As shown in FIG. 4, the shoulder socket 36 comprises a main body 50, a sealing system 52 and an interior cavity 54. As shown in FIG. 6B, the main body 50 is, in one form, of a unitary design and has an interior surface 56 which defines the interior chamber/recess 54. In one form, the shoulder socket 36 is provided with the entry passage 60 which in this form is contiguous or substantially contiguous with the interior surface 44 of the attachment portion 34. Of course, it should be reiterated that because in one form, the sections 34 and 36 are a unitary structure, it could be manufactured as a solid unitary structure without the welding at the intersection 39 as shown in FIG. 2.

Referring back to FIG. 6, it can be appreciated that the interior surface forms, at least in part, a spherical surface adapted to engage the outer surface of the ball joint 96. The sealing system 52 comprises primary seal 62 which extends circumferentially around the ball joint 96. The primary seal is oriented in a manner where the outer lip 112 of the ball joint does not pass thereby, such as in an extreme orientation of the components as shown in FIG. 6B. In one form, a secondary seal 64 is further provided where a recess 66 positioned within the main body 50 provides an annular groove for the seals 62 and 64. Further, a backing plate 68 is positioned in the laterally inward region where a retaining member 70, such as a snap-ring which is adapted to fit within the annular groove 72, can provide in one form a third redundant seal and further provides a retaining operation to retain the ball joint 96 within the recess 52. Of course, in one form, the backing plate 68 has a partially spherical surface 74 which is adapted to engage the outer surface 98 of the ball joint 96. The second pivot attachment assembly 24 contains similar operating components. However, it should be noted that the backing plate 68' may be of a slightly different design given that in one form, the diameter dimension in one form is greater than the diameter dimension 141 of the first member of 122 as the central connection 26. In other words, in one form there can be a slight frusto-conical surface 80 which is configured to engage the outer surface in the longitudinally outward region 83 of the second member to limit the amount of rotation of the central connector 26 with respect to the second pivot attachment assembly 24. In a like manner, it can be appreciated how the surface 84 in the left-hand portion of FIG. 4 can be a frusto-conical surface adapted to engage the outer surface of the longitudinally outward region in the first direction of the central connector 26, and more specifically of the smaller diameter first member 122. Of course, the surfaces 80 and 84 need not be frusto-conical. However, it is desirable to have a frusto-conical surface for a fuller engagement of the outer surfaces 134 and 83 of the first and second members 122 and 124 of the central chamber 26. It should be noted that the snap ring 70, which in the broader form is some type of a retaining member, places the backing member 68 in slight forceful engagement with the outer surface 98 of the ball joint 96.

With the foregoing description in place, there will now be a more detailed discussion of the central connector 26 with initial reference to FIG. 1. In FIG. 1, the central chamber 26 of the connection mechanism 20 is shown. It is oriented where the central axis of the adjacent pivot attachment assemblies 22 and 24 are not co-linear with the central axis of the central connector 26. As shown in FIG. 2, the central connector 26 is shown in a side view where in general, the central connector comprises a first longitudinal region 90, a central region 92, and a second longitudinal region 96.

Now referring to FIG. 4, there is a partial sectional view of the second longitudinal end 94, which will be described in detail with the understanding that the discussion of the second longitudinal end and, more particularly, the ball joint 96 is relevant to the first longitudinal end 90. In general, the ball joint 96 has an outer surface 98 that is partially spherical and fits within the chamber 97. As noted above, the outer surface 98 is adapted to engage the sealing system 52, and more particularly, the primary and secondary seals 62 and 64 along with the backing plate 68. The ball joint 96 comprises an inner surface 100 which has longitudinally inward and outward regions. In general, the longitudinally outward region in one form forms a partial frusto-conical surface 102 having a center axis 30' which is referenced at the center origin of the frusto-conical surface 102. The ball joint 96 basically rotates around a center point 104 as shown in FIG. 6B which is positioned substantially at the center of the outer spherical surface 98. The frusto-conical surface 102, which is shown cross-sectionally in FIG. 6B, forms an angle 108 which, as described further herein in a preferred form, is less than the maximum angle of displacement of the central connector 26 with the second pivot attachment assemblies 22 and 24 so the flow of the fluid is not striking (at least directly striking) the area 114 which is adjacent to the outer lip 112.

The outer lip 112 is at the longitudinal outward region of the ball joint 96, and as shown in FIG. 6B, at an extreme location, the fluid (which is compressible or incompressible) is adapted to enter the chamber region 97 of the ball joint 96 without, as mentioned above, directly striking (for example) the surface 114 which can occur if the frusto-conical surface is at too small of an apical angle with respect to the amount of rotation of the central connection 22 with respect to the second pivot attachment assembly 24.

Referring back to the surfaces 80 and 84 in FIG. 4, in one form, the apical angle between the surface 80 and the outer surface 83 of the central connector 26 is the same or slightly less than the angle between the interior frusto-conical surface 102 and the central access 30' (for both of the ball joints respectively). To state it otherwise, the apical angle 81 of the frusto-conical surface at 80 and 84, with respect to the axes 32 and 30 respectively, is less than or equal to the angle indicated at 108. It should further be noted, at the transition point interface 120, the change in the angular relationships need not be abrupt but could be provided with a fillet for a desirable fluid flow thereabout.

Now referring to the more longitudinally central region of the central connector 26, as shown in FIG. 2, in general, in one form the central connector 26 is comprised of first and second members 122 and 124. In one form, the members 122 and 124 are telescopically extending where the diameter indicated at 141 of the first member 124 is substantially the same diameter 128 as shown in FIG. 6B. The first member comprises the longitudinally inward portion 130 and longitudinally outward portion 132. As introduced above, the longitudinally outward portion 132 has an outer surface 134 that is adapted to engage the surface 84 when in an extreme orientation such as that shown in FIG. 6A (and better shown in the cross-sectional view in FIG. 6B). The first member 122 has an outer surface 140 which in one form is a grooved surface adapted to engage the corresponding interior conical surface 280 of the flexible assembly 240.

As shown in FIG. 4, the outer surface region indicated at 142 is adapted to be retained within the chamber region 132" of the second member 124 and engage (or at least be in relatively close engagement to) the interior surface 170. Also located on the interior portion of the first member 122 is a sealing system 150, which in one form is comprised of annular grooves 152 and 154, which can be positioned on the interior portion of the first member 122. Sealing members that are toroidal in shape or are otherwise cylindrical are positioned therein to maintain a positive seal within the chamber region 123 of the central chamber 26. As further shown in FIG. 4, a third seal can be provided where the annular recess 160 is adapted to have a rim placed therein where a retaining member 162, such a snap ring, holds a seal in place. It should be noted that in one form, the sealing arrangement is desirable where the radially inward pressure upon the outer surface 142 of the seal positioned in the groove at 160 will engage the seal placed in the end of the groove 152 to prevent the first and second components 122 and 124 from fully withdrawing from one another in the field.

Now referring to the right-hand portion of FIG. 4, there is shown the second member 124 in a partial sectional view. The second member 124 in general is adapted to telescopically receive the first member 122. As shown in FIG. 6B, the interior cylindrical surface has a diameter 128, which as noted above is slightly larger or approximately the same size as the diameter 141 (see FIG. 2) of the first member 122. The interior surface 170 in part forms the chamber region 123, which defines the fluid passage of the central connector 26. In the preferred form, the fluid flow travels from the first region to the second region (from left to right in FIG. 4) where the fluid exiting the longitudinally inward portion of the first member 122 enters the greater surface area of the chamber region 123 for a more desirable fluid flow. It should be noted that perhaps light eddy currents can occur at the region 190 in this arrangement, but present analysis indicates this is a more desirable flow depending upon, of course, the velocity, density and other factors related to the fluid, such as if there is particulate matter contained therein so there is not a direct impact upon the lip portion 131.

The second member 124 as shown in, for example, FIG. 2 has an outer surface 200 which is a grooved surface. The surfaces 140 and 200 can be of a similar nature, but they do not need to be identical. As described further herein, the grooved exterior surfaces at 140 and 200 are adapted to engage corresponding grooves within the flexing assembly 240. It should be noted that the grooved surfaces can be helical, such as a thread, but in a preferred form are pure annular grooves to fixedly and removably attach the flexing assembly 240. The surfaces 140 and 200 have longitudinal dimensions 141 and 201 (as shown in FIG. 2) which allow for the flexing member 240 to be positioned in a plurality of orientations where the central connector can accommodate a variety of widths such as those shown in FIG. 3. In one form, the diameter of the surface 200 is greater than the diameter of the surface 140, for ease of manufacturing. Because the diameter of the second member 124 must at least be, in part, of a greater diameter than the portion 142 of the first member 122 (see FIG. 4), it is a simpler manufacturing process to simply have a larger diameter for the surface 140 and have the flexing assembly 240 have a second attachment portion 244 accommodate such a diameter. Of course, in other forms, the diameters can be equal or of different size in the opposite manner as shown in FIG. 4, or further, the flexing assembly's long-term extending members could extend a further greater distance where the diameter of the second member narrows to be equal of to the diameter of the surface 140.

Figure 7:
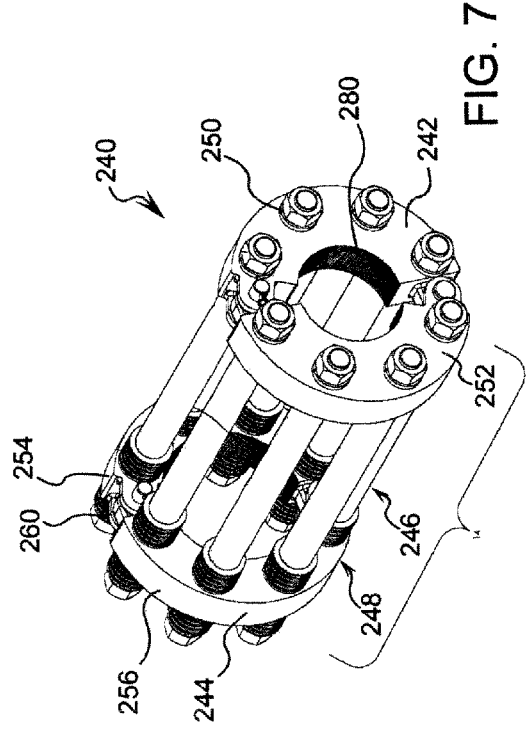
FIG. 7 shows the flexing assembly as an external device configured to attach to the exterior surface of the central region of the connecting member.
Figure 8:
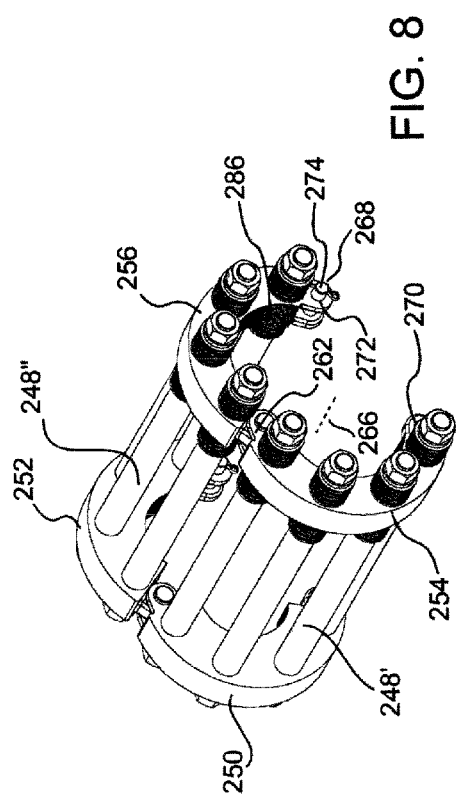
FIG. 8 shows the flexing assembly in an open orientation.

Now referring to the central portion of the central connector 26, the flexing assembly 240 is shown in FIG. 1. As seen in FIG. 1, the flexing assembly 240 is adapted to engage and be fixedly (and removably in one form) attached to the first and second members 122 and 124. Referring ahead to FIGS. 7-8, in general, the flexing member 240 comprises a first attachment portion 242 and a second attachment portion 244. Connecting the first and second attachment portions is the longitudinal attachment mechanism 246. In one form, the longitudinal attachment mechanism 246 is comprised of a plurality of longitudinally extending members 248. In one form, the flexing assembly 240 is adapted to be clamped or operate as a claw-like mechanism to envelop around the first and second members 122 and 124. As shown in FIGS. 7 and 8, the first and second attachment portions are each comprised of first and second sections 250, 252, 254 and 256 respectively. Referring to the first attachment portion 242, the two sections 250 and 252 are pivotally connected at the pivot attachment region 260, which has a center pivot axis that is co-linear with the pivot attachment region 262 as shown in FIG. 8.

The diametrically opposed region of the attachment regions 260 and 262 is a latching mechanism 268 which can be of a variety of forms. In general, the center axis of the pivot attachment regions 260 and 262 form a longitudinal pivot axis 266. In one form, a receiving portion 270 is adapted to be positioned adjacent to the portion 272 where openings contained in both regions are positionally aligned with respect to one another to correspond in location and a pin-like member 274 extends there through. Of course, in other forms, a hook and loop leverage latch assembly or the like could be utilized to lock the first and second regions 250 and 254 to the second regions 252 and 256. As shown in FIG. 8, the sections 250 and 254 are effectively connected by a portion of the longitudinal attachment mechanism, and more particularly, the four longitudinal members to 248. In a like manner, the second sections 252 and 256 are effectively connected by the longitudinally extending members 248. As shown in FIG. 7, the first section 242 has the grooved surface 280, which is a serrated bore and is adapted to engage the outer surface 140. Of course a plurality of types of engagements can be employed, but when desirable type of arrangement is having the various grooves correspond in height, width and depth substantially with one another amongst the surfaces 140 and 280 to provide a strong frictional and structural engagement between the first member 122 and the first attachment portion 242. Of course, a variety of types of attachments can be employed.

Now referring to FIG. 8, which shows the unit rotated about a lateral axis 16 (see FIG. 1), the interior surface 286 is also of a grooved serrated-type surface which is adapted to engage the outer surface 200 of the second member 124. Now referring to FIG. 9, there is shown a close-up system of one of the longitudinally extending members 248. In one form, the longitudinal attachment mechanism 246, which as noted above in one preferred form is comprised of a plurality of the longitudinally extended members 248, has a spring system 300. In one form, the spring system is comprised of spring elements 302, which in one form are positioned longitudinally outward and inward of one (or in some cases both) of the attachment portions, such as the second attachment portion 242 shown in FIG. 9. In one form, the spring members 302 are a plurality of conically-shaped washers which have a desirable spring constant to allow a certain amount of flexion between the first and second attachment portions 242 and 244.

Figure 9:
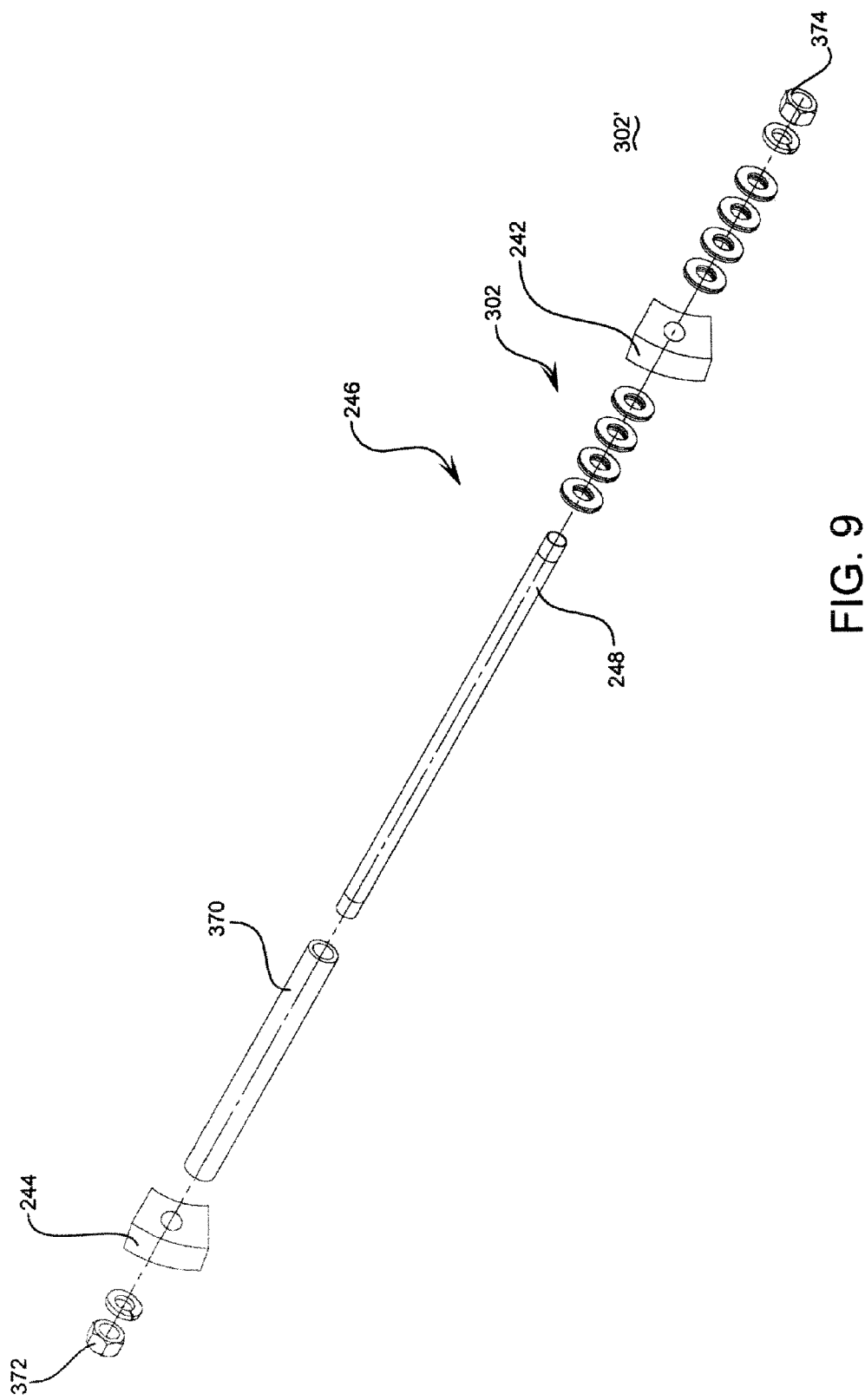
FIG. 9 shows and exploded view of one of the members comprising the longitudinal attachment mechanism.

With reference to FIG. 9, it can be appreciated how the spring members 302 and 302" can operate to allow a degree of flexion between the first attachment portion 242 and the second attachment portion 244. As discussed in more detail below, a spring system 300 is adapted to address more static-like deflections; in other words, very slow deflections such as from thermal expansion between the first and second pipe fixtures 343 and 342 such as that as shown in FIG. 3. The spring system further, in one form, is adapted to address vibratory-type deflections where vibrations between the first and second pipe fixtures 340 and 342 can be at least partially dampened vibrations to isolate portions of line that by nature of the steel pipe, transmits vibrations there through. As further shown in FIG. 9, there is a positioning sleeve 370 which is adapted to maintain the position between the first and second attachment portions 242 and 244, which are shown partially in FIG. 9. In one form, conventional connectors such as threaded lock nuts indicated at 372 and 374 can be utilized to the unit together.

Figure 10:
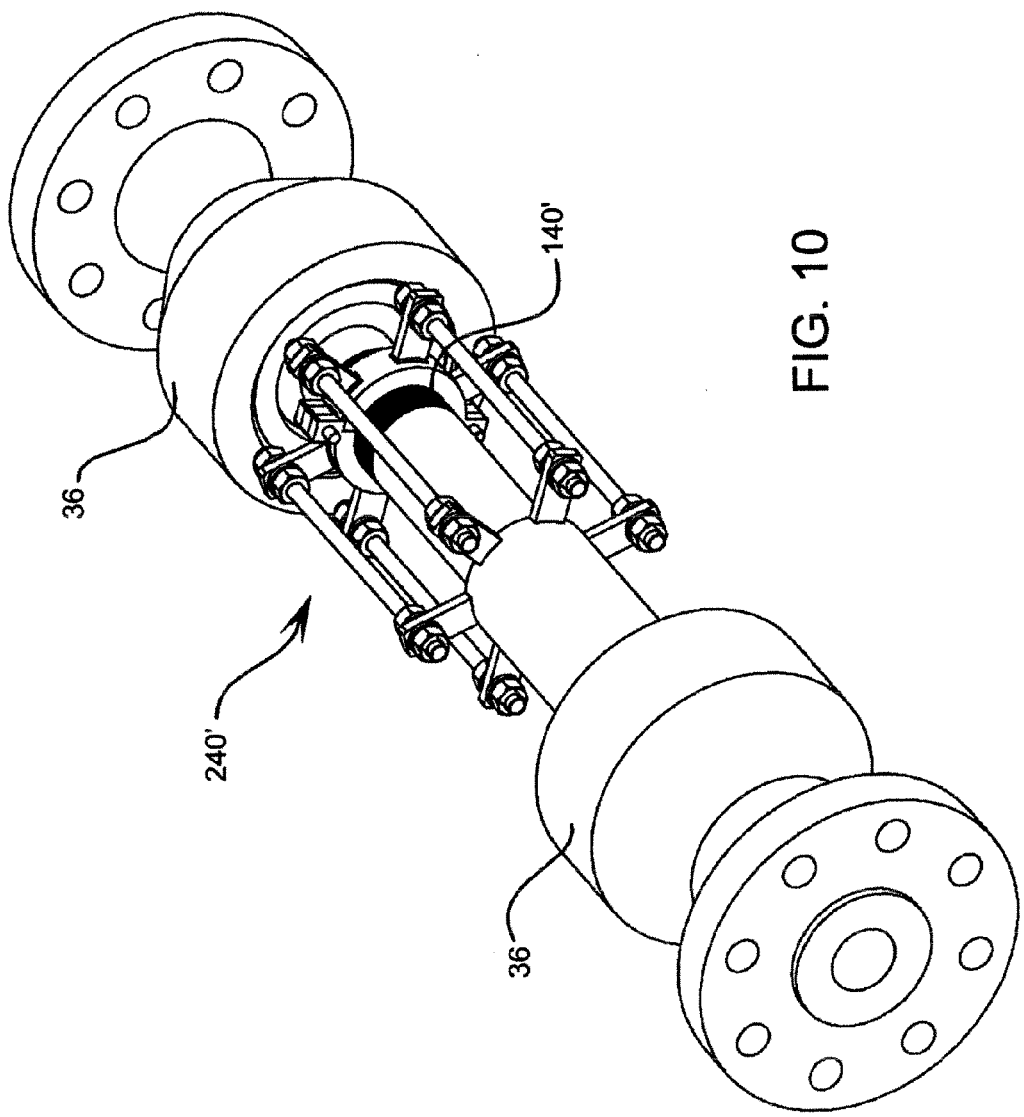
FIG. 10 shows an isometric view of another embodiment of a flexing assembly.
Figure 11:
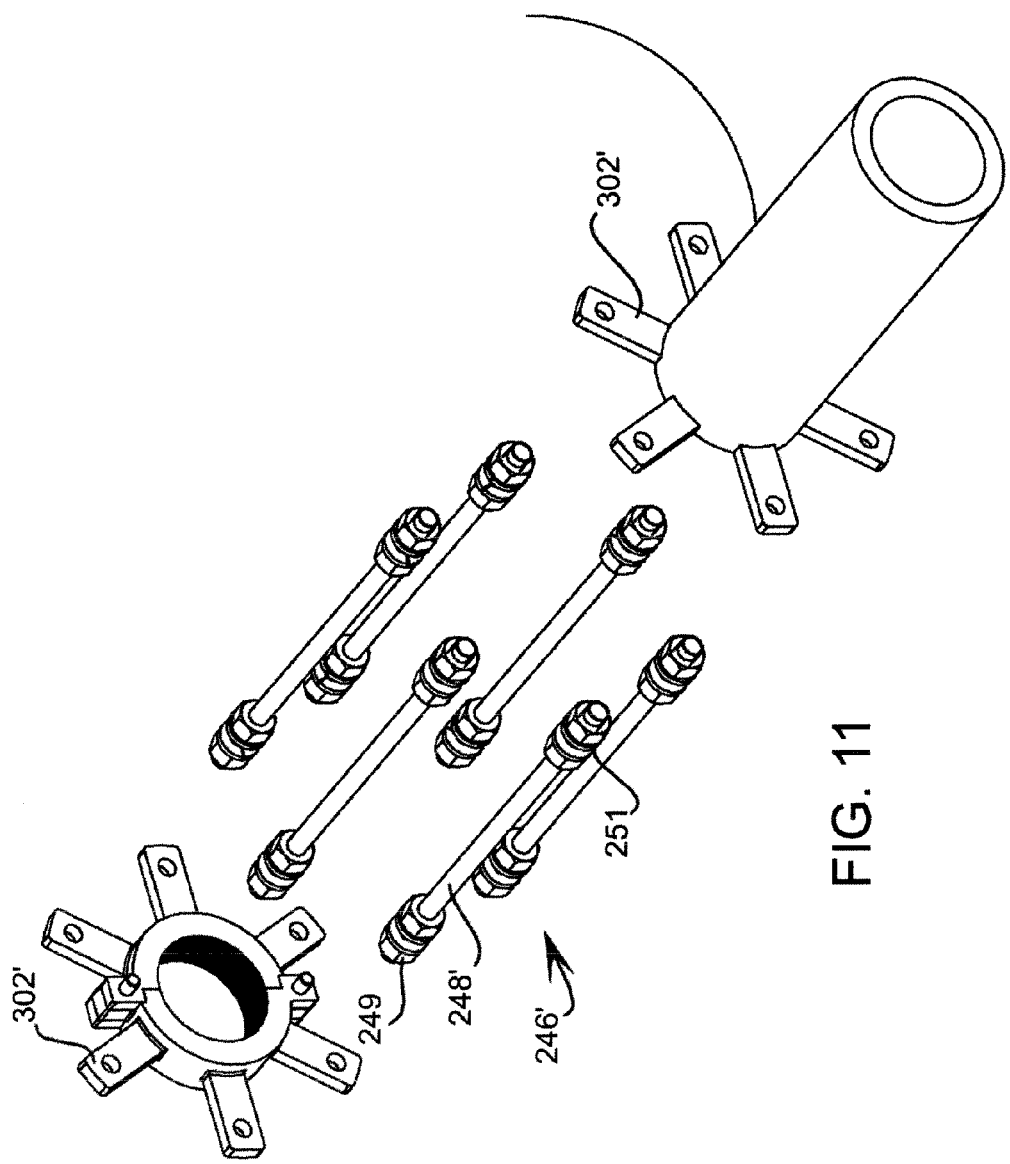
FIG. 11 shows an exploded view of the second embodiment of the flexing assembly.
Figure 12:
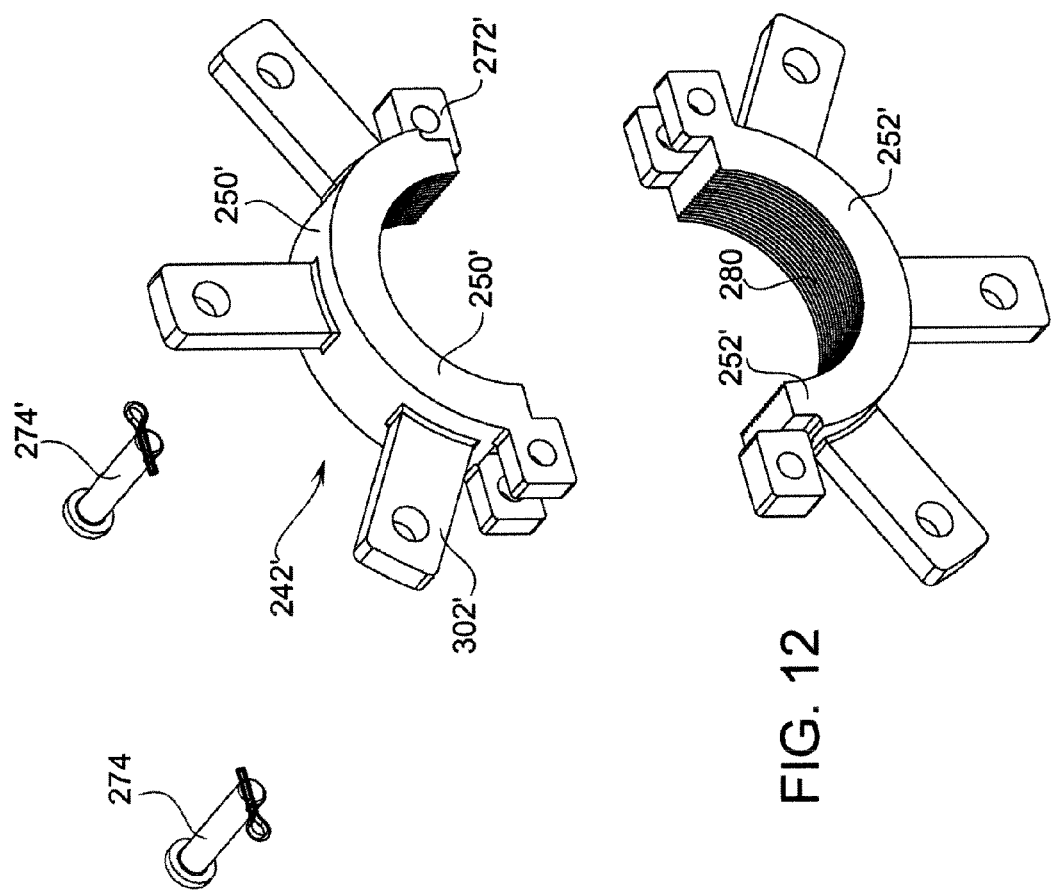
FIG. 12 shows an exploded view of one of the attachment mechanisms of the second embodiment of the flexing assembly.

Now referring to FIG. 10, there is shown another embodiment of the flexing assembly 240' as shown in an isometric view. Referring now to FIG. 11, the longitudinal attachment mechanism 246' is somewhat similar to the mechanism 246, as shown in FIG. 9. However, in FIG. 10, the plurality of longitudinally extending members 248' have attachment regions 249 and 251 which in one form are comprised of bolted members. The spring members 302' as shown in FIG. 11 are of an alternate design where they operate more as a cantilevered-type extending spring where as shown in FIG. 12, the first attachment region 242' is comprised of sections 250' and 252'. The interior surface 280 is adapted to engage the exterior surface 140' as shown in FIG. 10. An attachment mechanism 272' can be employed where the attachment pin members 274' can be utilized to attached the sections 250' and 252' together. Of course, the embodiment as shown in FIGS. 10-12 illustrates another teaching of the broad concept of the very versatile connecting mechanism.

In a preferred form, the flexing assembly 240 allows for a slight telescopic extension of the first and second members 242 and 244. In general, this movement can be classified into two general categories: vibratory-type motion, and temporary compressive or tensile displacement. The method of handling these types of motions is described further herein following a detailed description of the installation and the operating environment as described in FIG. 3. With the foregoing technical description in mind, there will be discussion of a method of installing the connection member 20.

Figure 5:
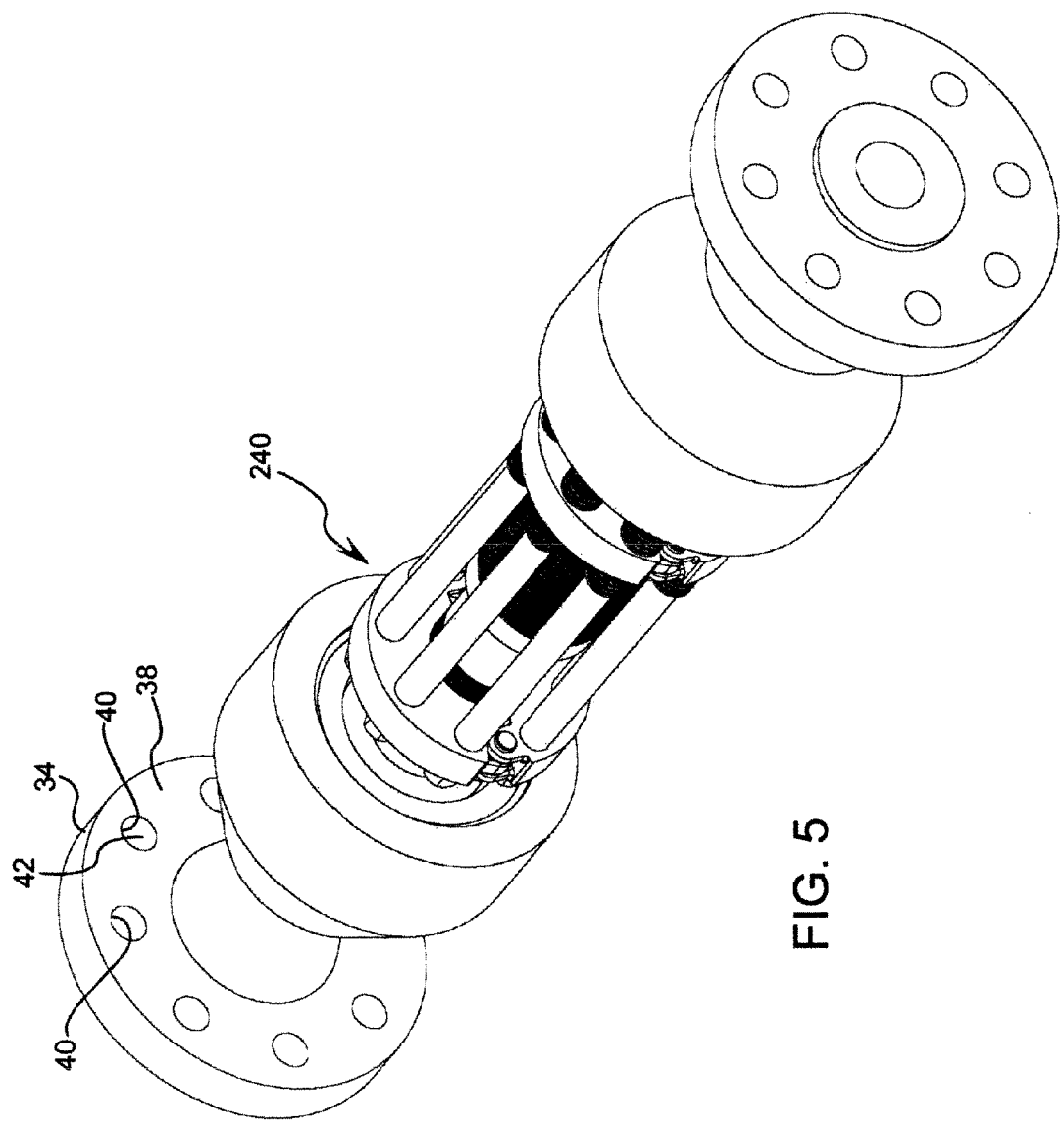
FIG. 5 shows another isometric view of the connecting member and more particularly the flange regions.

As shown in FIG. 3, there is a very schematic view of an operating environment where the connecting mechanism 20 can be implemented. In general, the first piping fixture 340 is in somewhat of an approximate location to the second piping fixture 342. The first and second piping fixtures, in general, are fitted with flange members 344 and 346 which correspond to the first and second attachment portions 34 and 34' and more particularly to the flange region 38 and the plurality of openings 42 (see FIG. 5). Of course, as noted above, a variety of attachment-like mechanism can be implemented as opposed to a flange that is adapted to be bolted, but in one sector of technology such as the oil and gas sector, it is most common to have flange-like members for connecting portions of pipe. Referring back to FIG. 3, the first pipe fixture which presumably has an interior cylindrical bore has a central axis indicated at 340. The second pipe fixture 342 further has a central axis 350, and the second pipe fixture 342 has a central axis 352. Oftentimes when connecting pipes, the axes 350 and 352 are not co-linear. Further, to be more precise, the central axes could be offset from one another, or most likely offset and non-intersecting. Further, one of the sections 340 or 342 may be attached to some form of mechanism, such as a pump or compressor which can cause vibration. Further, depending upon the length of the material and various factors, thermal expansion/contraction can occur, changing the relationship between not only the distance 360 between the members, but also the first and second pipe fixtures 340 and 342, and further, the relationship between the axes 350 and 352. For example, if the first fixture 340 is attached to a series of elbows (90-degree fittings), thermal deflection can displace the axis 350 in a direction other than the alignment of the axes 350 (for example, orthogonal thereto if there is an orthogonal pipe fitting somewhere removed from the terminating end of the pipe fixture 340).

Therefore, it can be appreciated that in connecting the pipe fixtures 340 and 342, the installer must consider the immediate orientation of the central axis 350 and 352 (and, practically speaking, the installer may utilize the flange portions 344 and 346, which is the point of connection). Further, in certain circumstances it is desirable to allow the pipe fixtures 340 and 342 to allow for a certain amount of flexion there between, as well as attempt to isolate vibrations there between. Therefore, it can be appreciated in particular with the detailed foregoing description above, that the operation of the connecting mechanism 20 is such that the pivot attachment assemblies 22 and 24 (such as those shown in FIG. 1) can be reoriented about the axes 28 and 32 (see FIG. 6), say to accommodate the orientations of the axes 350 and 352, or to be co-linear therewith, depending on field conditions (to be more precise). As shown in FIG. 6A, the side view illustrates the basic concept of the pivot attachment assemblies 22 and 24 re-orienting with respect to the central connection 26. However, of course it can be noted that the axes 28 and 32, as well as the axis 30, need not all be in the same plane, such as that shown in FIG. 6. In fact, oftentimes these axes will not be in the same plane, where for example the axis 32 may extend out from the plane defined by the axis 28 and 30, for example.

With the foregoing description in place as to the matter of installation and schematically showing the operating environment above, it has been previously noted that the general type of movement between the first and second pipe regions 340 and 342 can be generally classified in two types of categories. There is a vibratory-type motion where, for example, one of the pipe members 340 and 342 are attached to a piece of equipment and causing vibration such as some form of a pump or a compressor. The other broad category of motion is a more static compressive or contractive type of displacement which can be attributed to thermal expansion/contraction.

It should be noted that the flexing member allows for a certain amount of displacement between the first and second members 122 and 124. For example in the broader range the motion between the telescoping members can be up to for example up to 0 mm-20 mm. A more preferred range is a prescribed amount of motion of about 0 mm-5 mm given the common forces that are exerted upon the unit in the field. The motion is generally high frequency low amplitude and can be oscillatory-type motion which aids in dampening vibrations. Or, the motion can be, for example, a thermal expansion of one of the fixtures 340 or 342 where the flexing member with its spring like members comprised thereof will absorb a certain amount of the deflection. Of course, it should further be noted that the ball and joint system can also allow for a certain amount of deflection of the pipe fixtures 340 and 342. In other words, various angles in the pipe such as right angles to the axis 350 as shown in FIG. 3 can cause a certain amount of displacement of the axis 350 with respect to the axis 352. This displacement can occur in essentially any six of the forms of movement (movement in either of the orthogonal directions or rotation about the various directions). Of course, the ball and joint arrangement of the member 20 is well suited to handle such reorientation in the field. Further, the various sealing assemblies as described in great detail above between the ball and joint mechanisms as well as the telescopic extending members maintains a seal for transmittal of fluid (whether compressible or incompressible) there through. Of course the flexing assembly can be in other forms such as a sheath like member as a single unit or in two parts.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A connecting member comprising:
   first and second pivot attachment assemblies, the pivot attachment assemblies comprising an attachment portion connected to a shoulder socket, a ball joint attached in a recessed region of the shoulder socket; and
   a central connector connected to the ball joint and having an interior surface defining a fluid passageway, the central connector comprising first and second members where the first member telescopically extends within the second member, the second member being attached to the shoulder socket of the second pivot attachment assembly, the central connector further comprising a flexing assembly having first and second attachment portions, the first attachment portion being fixedly attached to the first member and the second attachment portion being fixedly attached to the second member, the flexing assembly comprising a plurality of longitudinally extending members being operatively configured to allow a predefined forceful degree of travel between the first and second attachment portions of the flexing assembly, wherein the second member has an interior surface having at least part of a conical shape that is adapted to receive the first member therein, wherein the first member has an end portion having a circumferential seal adapted to extend within the interior surface of the second member and is adapted to be positioned inward or outward of the flexing assembly after installation.

2. The connecting member as recited in claim 1 where the inward and outward relocation of the first member with respect to the second member occurs to vibration.

3. The connecting member as recited in claim 1 where the inward and outward repositioning of the first member within the second member occurs with regard to thermal expansion of the installation environment.

4. A connecting member comprising:
   first and second pivot attachment assemblies, the pivot attachment assemblies comprising an attachment portion connected to a shoulder socket, a ball joint attached in a recessed region of the shoulder socket; and
   a central connector connected to the ball joint and having an interior surface defining a fluid passageway, the central connector comprising first and second members where the first member telescopically extends within the second member, the second member being attached to the shoulder socket of the second pivot attachment assembly, the central connector further comprising a flexing assembly having first and second attachment portions, the first attachment portion being fixedly attached to the first member and the second attachment portion being fixedly attached to the second member, the flexing assembly comprising a plurality of longitudinally extending members being operatively configured to allow a predefined forceful degree of travel between the first and second attachment portions of the flexing assembly, wherein the first and second members have a plurality of spring members positioned on either side of the first or second attachment portions of the flexing assembly to allow a prescribed amount of movement there between.

5. A connecting member comprising:
   first and second pivot attachment assemblies, the pivot attachment assemblies comprising an attachment portion connected to a shoulder socket, a ball joint attached in a recessed region of the shoulder socket; and
   a central connector connected to the ball joint and having an interior surface defining a fluid passageway, the central connector comprising first and second members where the first member telescopically extends within the second member, the second member being attached to the shoulder socket of the second pivot attachment assembly, the central connector further comprising a flexing assembly having first and second attachment portions, the first attachment portion being fixedly attached to the first member and the second attachment portion being fixedly attached to the second member, the flexing assembly comprising a plurality of longitudinally extending members being operatively configured to allow a predefined forceful degree of travel between the first and second attachment portions of the flexing assembly, wherein the flexing assembly comprises first and second members pivotally attached about a longitudinal pivot axis where a latching mechanism is positioned on an opposing portion of the flexing assembly with respect to the longitudinal pivot axis and is adapted to engage an outer surface of the first and second members of the central connector.

6. A connecting member comprising:
   first and second pivot attachment assemblies, the pivot attachment assemblies comprising an attachment portion connected to a shoulder socket, a ball joint attached in a recessed region of the shoulder socket; and
   a central connector connected to the ball joint and having an interior surface defining a fluid passageway, the central connector comprising first and second members where the first member telescopically extends within the second member, the second member being attached to the shoulder socket of the second pivot attachment assembly, the central connector further comprising a flexing assembly having first and second attachment portions, the first attachment portion being fixedly attached to the first member and the second attachment portion being fixedly attached to the second member, the flexing assembly comprising a plurality of longitudinally extending members being operatively configured to allow a predefined forceful degree of travel between the first and second attachment portions of the flexing assembly, wherein the flexing assembly is a non-unitary device with respect to the first and second members and attaches to the outer surface of the first and second members at the first and second attachment portions, respectively, and wherein the first attachment portion of the flexing assembly defines an inner grooved surface that is adapted to engage a corresponding grooved surface of the first member and the second attachment portion of the flexing assembly has an inner grooved surface at the second attachment portion that is adapted to engage a grooved outer surface of the second member of the central connector.

7. The connecting member as recited in claim 6 wherein the inner grooved surface of the second attachment portion of the flexing assembly is of a greater diameter than the inner grooved surface of the first attachment portion of the flexing assembly.

8. A connecting member comprising:

first and second pivot attachment assemblies, the pivot attachment assemblies comprising an attachment portion connected to a shoulder socket, a ball joint attached in a recessed region of the shoulder socket; and a central connector connected to the ball joint and having an interior surface defining a fluid passageway, the central connector comprising first and second members where the first member telescopically extends within the second member, the second member being attached to the shoulder socket of the second pivot attachment assembly, the central connector further comprising a flexing assembly having first and second attachment portions, the first attachment portion being fixedly attached to the first member and the second attachment portion being fixedly attached to the second member, the flexing assembly comprising a plurality of longitudinally extending members being operatively configured to allow a predefined forceful degree of travel between the first and second attachment portions of the flexing assembly, wherein the first and second ball joints have three circular seals positioned there around interposed between an outer surface of the ball joint and the recess region of the shoulder socket.

9. A connecting member comprising:

first and second pivot attachment assemblies, the pivot attachment assemblies comprising an attachment portion connected to a shoulder socket, a ball joint attached in a recessed region of the shoulder socket; and a central connector connected to the ball joint and having an interior surface defining a fluid passageway, the central connector comprising first and second members where the first member telescopically extends within the second member, the second member being attached to the shoulder socket of the second pivot attachment assembly, the central connector further comprising a flexing assembly having first and second attachment portions, the first attachment portion being fixedly attached to the first member and the second attachment portion being fixedly attached to the second member, the flexing assembly comprising a plurality of longitudinally extending members being operatively configured to allow a predefined forceful degree of travel between the first and second attachment portions of the flexing assembly, wherein the second member at a longitudinally inward region has a retaining ring to prevent the first member from being removed from the second member.

* * * * *